(12) United States Patent
Lane et al.

(10) Patent No.: US 10,060,826 B2
(45) Date of Patent: Aug. 28, 2018

(54) OPTICAL FIBER MECHANICAL SPLICE TERMINATION AND TEST APPARATUS AND METHODS

(71) Applicant: Panduit Corp., Tinley Park, IL (US)

(72) Inventors: Brett Lane, Hinsdale, IL (US); Robert A. Reid, Monticello, IN (US); Joseph M. Nash, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 668 days.

(21) Appl. No.: 14/084,262

(22) Filed: Nov. 19, 2013

(65) Prior Publication Data

US 2014/0226148 A1 Aug. 14, 2014

Related U.S. Application Data

(60) Provisional application No. 61/728,564, filed on Nov. 20, 2012.

(51) Int. Cl.
*G01M 11/00* (2006.01)
*G02B 6/38* (2006.01)

(52) U.S. Cl.
CPC ........ *G01M 11/31* (2013.01); *G01M 11/3109* (2013.01); *G02B 6/3807* (2013.01)

(58) Field of Classification Search
USPC ....................................................... 250/341.8
See application file for complete search history.

(56) References Cited

U.S. PATENT DOCUMENTS

2007/0014526 A1* 1/2007 Lazo ............................ 385/134

FOREIGN PATENT DOCUMENTS

WO 2004090499 A1 10/2004

OTHER PUBLICATIONS

Fluke Networks: "DTX Compact OTDR," four pages, 2007.
Lane, et al., Remotely Switched OTDR Conformance Testing at the Fiber Distribution Hub, four pages, 2009.

* cited by examiner

*Primary Examiner* — Edwin Gunberg
(74) *Attorney, Agent, or Firm* — Christopher S. Clancy; James H. Williams; Christopher K. Marlow

(57) ABSTRACT

Embodiments of the present invention generally relate to the field of optical fiber splicing, and more specifically to apparatuses and methods directed to mechanical splice termination and evaluation of resulting splice joints. In an embodiment, the present invention is an apparatus for evaluating the integrity of a mechanical splice joint comprising a light source, a circulator, a photo detector, and an analysis circuit, wherein the apparatus connects to a test connector and evaluates signals representative of light pulses passing through at least a portion of the test connector.

13 Claims, 6 Drawing Sheets

OPTICAL FIBER MECHANICAL SPLICE TERMINATION AND TEST APPARATUS AND METHODS

RELATED APPLICATIONS

This application claims the benefit of U.S. Provisional Patent Application No. 61/728,564, filed on Nov. 20, 2012, which is incorporated herein by reference in its entirety.

TECHNICAL FIELD

The present invention generally relates to the field of optical fiber splicing, and more specifically to apparatuses and methods directed to mechanical splice termination and evaluation of resulting splice joints.

BACKGROUND

When working with fiber optics, users are often required to establish connections between non-connectorized ends of optical fibers or fiber ribbons. In some instances, fusion splicing can be used to create high-performance permanent connections. However, fusion splicing equipment may be expensive and relatively cumbersome to use. Alternatively, fibers may be joined via mechanical means, which involves creating temporary or permanent joints between two fibers which abut one another in an alignment fixture. The alignment fixture may be an alignment tube which receives two ends of separate fibers on either side. In other instances, the alignment fixture may be a fiber optic connector with a stub fiber embedded therein made to be connectorized to a field fiber. In this case the field fiber can be terminated with a mechanical splice to the stub fiber inside the connector.

In order to avoid significant loss of signal and minimize the potential reflectance or light leakage within these joints, users must ensure that the fiber(s) are properly cleaved, that there is precise alignment between the fibers, and that transparent gel or optical adhesive applied between the fibers matches the optical properties of the glass. However, these details are not always easy to detect and/or ensure. Therefore, there is a need for apparatuses and methods directed towards helping to determine and improve the quality of mechanical splices and provide improved termination of field fibers.

SUMMARY

Accordingly, the present invention is generally directed towards helping to determine and improve the quality of mechanical splices of optical fibers, and provide methods and apparatuses to assist in fiber termination.

In one embodiment, the present invention is an apparatus for evaluating the integrity of a mechanical splice joint comprising a light source, a circulator, a photo detector, and an analysis circuit, wherein the apparatus connects to a test connector and evaluates signals representative of light pulses passing through at least a portion of the test connector.

In another embodiment, the present invention is an apparatus for evaluating integrity of a splice joint present within an optical fiber, the apparatus comprising a fiber optic coupling assembly configured to be directly or indirectly connectable to the optical fiber, a light source in optical communication with the fiber optic coupling assembly, the light source configured to generate light pulses, where the light pulses are coupled to the optical fiber, and where at least a portion of the coupled light pulses are at least one of backscattered and reflected within the optical fiber, and a photo detector in optical communication with the fiber optic coupling assembly, the photo detector configured to detect the at least one of backscatter and reflection.

In still another embodiment, the present invention is a method of evaluating the integrity of a mechanical splice joint, wherein the method includes coupling light pulses into a test connector and a field fiber, and evaluating signals representative of said light pulses propagating through at least a portion of said test connector and at least a portion of said field fiber.

In still yet another embodiment, the present invention is a method for evaluating integrity of a splice joint present within an optical fiber, the method comprising the steps of generating a series of light pulses, coupling the series of light pulses to the optical fiber, where at least a portion of the coupled series of light pulses are at least one of backscattered and reflected within the optical fiber, and detecting the at least one of backscatter and reflection.

These and other features, aspects, and advantages of the present invention will become better understood with reference to the following drawings, description, and any claims that may follow.

DETAILED DESCRIPTION

Figure 1:
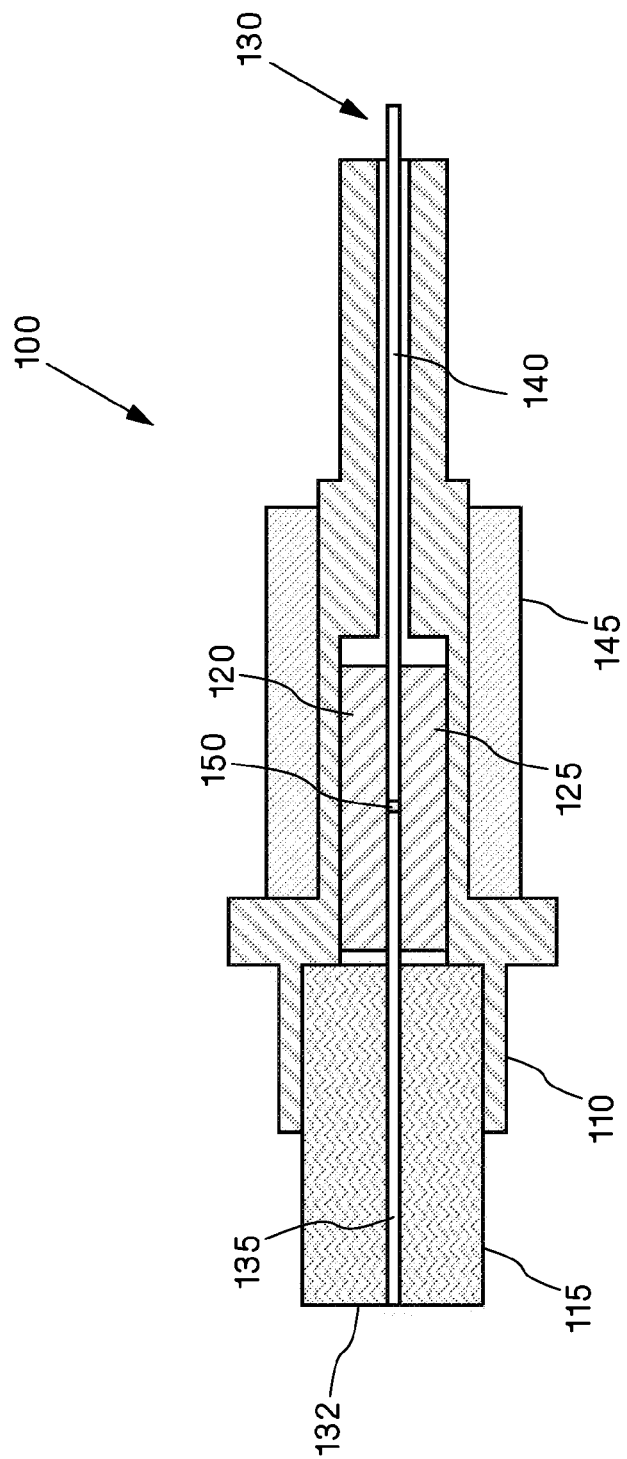
FIG. 1 illustrates a side cut-away view of a fiber optic connector with a stub fiber.

Mechanical splicing may be employed when a field optical fiber is connectorized to a pre-manufactured fiber optic connector with a stub fiber embedded therein. An example of such a connector is shown in FIG. 1. The particular example of FIG. 1 shows a re-terminatable connector similar to Panduit's OPTICAM® pre-polished fiber connectors. An example of such a connector is further detailed in U.S. Pat. No. 7,241,056, entitled "Reversible fiber optic connector," issued on Jul. 10, 2007, and incorporated herein by reference in its entirety. Connector 100 generally includes a ferrule holder 110 with a ferrule 115 positioned at the front end thereof, and a top plank 120 and a bottom plank 125 positioned between the ferrule 115 and an end 130 of the connector that is opposite of the end which includes the ferrule 115. The connector 100 includes a stub fiber 135 which is typically embedded in the optical connector at the time of manufacture. The stub fiber 135 extends from the outer edge 132 of the ferrule (which can later interface a corresponding adapter) to the inner portion of the connector in the general area of the top and bottom planks 120, 125. To splice the stub fiber 135 with a field fiber 140, a user inserts the field fiber 140 into the connector 100 through its distal end 130, aligns both fibers accordingly, and activates a cam 145 to clamp the field fiber and the stub fiber in place, forming a stub fiber/field fiber interface 150 (also referred to as a splice joint). Ensuring that light leakage and reflection are reduced and/or minimized at these joints can be essential to a well-executed splice. Accordingly, the present invention may help a user with proper splicing of two fibers.

Figure 2:
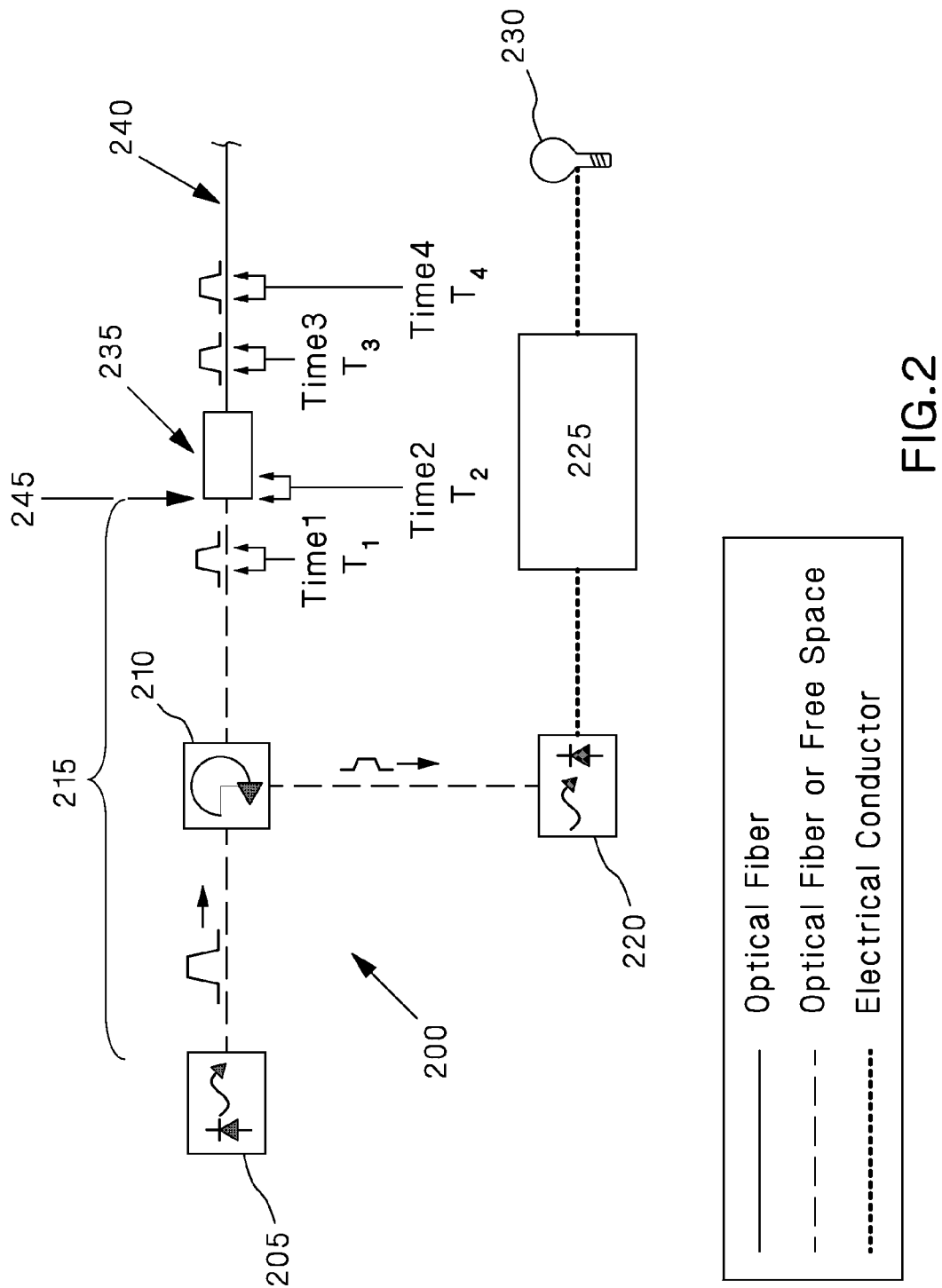
FIG. 2 illustrates a diagram representative of one embodiment of the present invention.

In one embodiment shown in FIG. 2, the present invention is an apparatus which may help a user terminate a field fiber to a connector's stub fiber and test the integrity of the resulting splice joint. The termination and test apparatus (TTA) 200 of the described embodiment includes a light source 205, a circulator or splitter 210, a photo detector 220, an analysis circuit 225, and a pass/fail indicator 230.

In one embodiment, the light source 205 includes a semiconductor laser capable of emitting a light signal having a wavelength between about 700 nm (nanometers) and about 1700 nm. In another embodiment, the light source 205 is capable of emitting a light signal having wavelength of at least one of about 780 nm, about 850 nm, about 1310 nm, about 1550 nm, and about 1625 nm. In yet another embodiment, the light source 205 can be at least one of a light emitting diode (LED), a vertical cavity surface-emitting laser (VCSEL), and any other known and/or common light source used in fiber optic communication. Likewise, the photo detector 220 can be any known and/or common photo detector used in fiber optic communication. In one embodiment, the photo detector 220 is at least one of a conventional PIN photo detector, an avalanche photo detector (APD), and a single photon avalanche diode (SPAD). Preferably, the photo detector 220 is capable of detecting light pulses generated by the light source 205, light pulse reflections occurring at a splice joint, and light backscattering occurring throughout at least some of the fibers positioned before or after the splice joint.

The light source 205, circulator 210, and photo detector 220 can be a part of a light coupling assembly 215, which in one embodiment also includes a fiber optic adapter (not shown). Such a fiber optic adapter can be used to interface the TTA with the connector that is being terminated and can include, but should not be limited to, LC, SC, MTP, MPO, MT, and other known fiber optic adapter formats. In some embodiments, the light source 205, circulator 210, photo detector 220, and the fiber optic adapter can be connectorized via optical fibers. In other embodiments, the light coupling assembly 215 can include free space optical components (e.g., lenses, beam-splitters, etc.) between the light source, circulator, photo detector, and/or fiber optic adapter. In yet other embodiments, the light coupling assembly can include a combination of free space optical components and optical fiber(s) connecting various elements (e.g., a fiber optic circulator or splitter connected to the light source and photo detector via optical fibers, and aligned to a free space lens used to couple light into and out of the adapter interface). In still yet another embodiment, the light coupling assembly can include any suitable means which would enable a pulse of light generated by the light source 205 to enter the test connector 235, and for light reflected from the splice joint and/or by way of backscattering to pass back into the TTA and the photo detector 220 without substantial signal loss.

The analysis circuit 225 can integrate and store the electrical output of the photo detector 220 during specified time intervals corresponding to various relevant spatial locations along the light pulse path. The integrated electrical signal is proportional to the optical power incident on the photo detector 220 during a particular time interval. The analysis circuit 225 may be comprised of a number of discrete and/or integrated circuits. These discrete and/or integrated circuits can be at least one of, but not limited to, a transimpedence amplifier, an analog-to-digital converter, memory, and microprocessor. The bandwidth of the analysis circuit may be optimized to obtain an appropriate signal to noise ratio while minimizing the attenuation dead zone length.

The TTA 200 can be embodied in a hand-held device such that it would be convenient for an installer/user to use during field installations. Such a hand-held device can include any additional necessary components, including, but not limited to, a power supply, a keyboard, a display (touch-screen or non-touch-screen), input/output ports and/or wired/wireless connections for device configuration and information transfer, circuitry and hardware necessary for operation of the TTA (e.g., electrical and optical conductors, and signal processors), and any other feature commonly found and/or desired on a hand-held device used in network connectivity installation and testing.

In an embodiment where the TTA 200 is a hand-held device, the light coupling assembly 215 can include components which are both internal and external relative to such a device. For example, while the light source 205, circulator 210, and photo detector 220 can all be positioned inside the hand-held device, the fiber optic adapter can be external relative to the hand-held device and can be connectorized to the hand-held device via an optical fiber. In a variation of such an embodiment, the fiber optic adapter can be removably attached to the hand-held device, permitting a user to interchange various adapters to conform to a particular test connector format. In another embodiment, the entire light coupling assembly is internal relative to a hand-held device.

Figure 3:
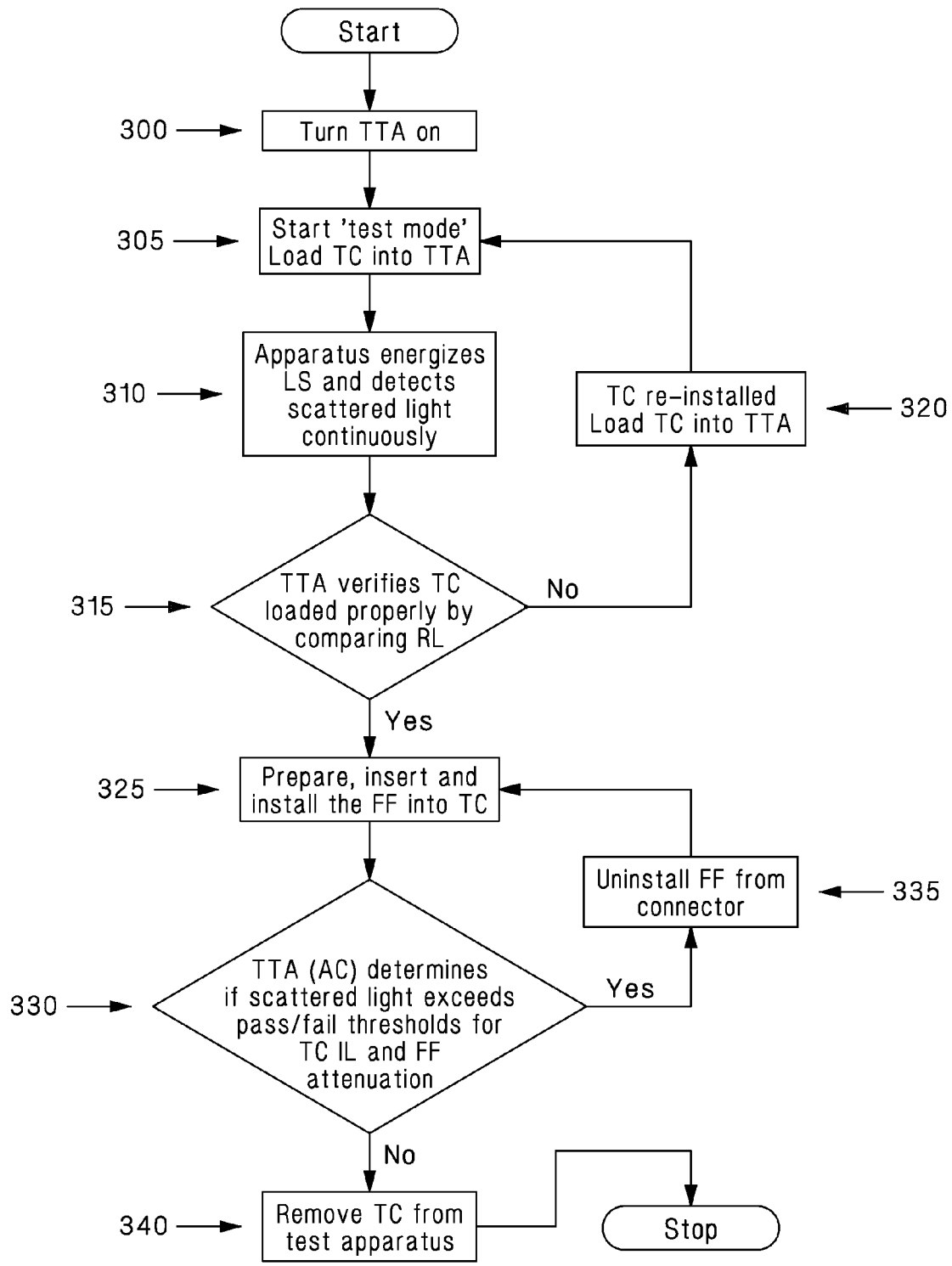
FIG. 3 illustrates a method terminating a field fiber according to an embodiment of the present invention.

FIG. 3 illustrates a chart representative of a method of terminating a field fiber to a test connector and using the termination and test apparatus 200 in accordance with one embodiment of the present invention. To use the TTA 200, the user turns on the device, supplying power to all necessary power-consuming components such as, but not limited to, the light source 205, photo detector 220, and the analysis circuit 225. Either by default upon power-up or by means of an input, the user puts the TTA 200 into a test mode 305, where a pulse generator (not shown) applies a series of short electrical pulses to the light source 205 to generate a corresponding series of light pulses. The number of light pulses, which ultimately result in electrical signals received, analyzed, and integrated by the analysis circuit, may be optimized to obtain an appropriate signal-to-noise ratio. The signal-to-noise ratio generally improves as the number of pulses increases. However, it is also important to attempt to minimize the total measurement time to increase the overall efficiency. In one embodiment, the light pulses are of very short duration, preferably between about 0.1 ns (nanosecond) and about 1 µs (microsecond), to improve the spatial resolution, thereby minimizing the distance between reflective or non-reflective events within the fiber, of the TTA. Additionally, the amplitude of the light pulses may be optimized to obtain an appropriate signal-to-noise ratio over the spatial region of consideration. In one embodiment, the amplitude of the light pulses is in the range of about 0.1 mW (milliwatt) to 100 mW.

Prior to being able to terminate a field fiber 240 to the test connector 235 and evaluate the resulting splice joint, the test connector must be properly coupled to the coupling assembly 215. To determine if a proper connection has been established between the test connector 235 and the coupling assembly 215, the TTA detects 310 and analyzes 315 various reflections occurring within the optical fibers of the coupling assembly and/or within the stub fiber of the test connector 235. Due to Fresnel reflections and Rayleigh scattering inherent in the fiber, some portions of the light pulses are backscattered throughout the length optical fiber(s) and reflected at fiber junctions. The reflected and backscattered light is coupled via the coupling assembly 215 onto a photo detector 220, which is sensitive to the wavelength of light emitted by the light source 205, causing the photo detector 220 to output a signal which represents the magnitude of the return loss during a particular time interval.

Figure 4:
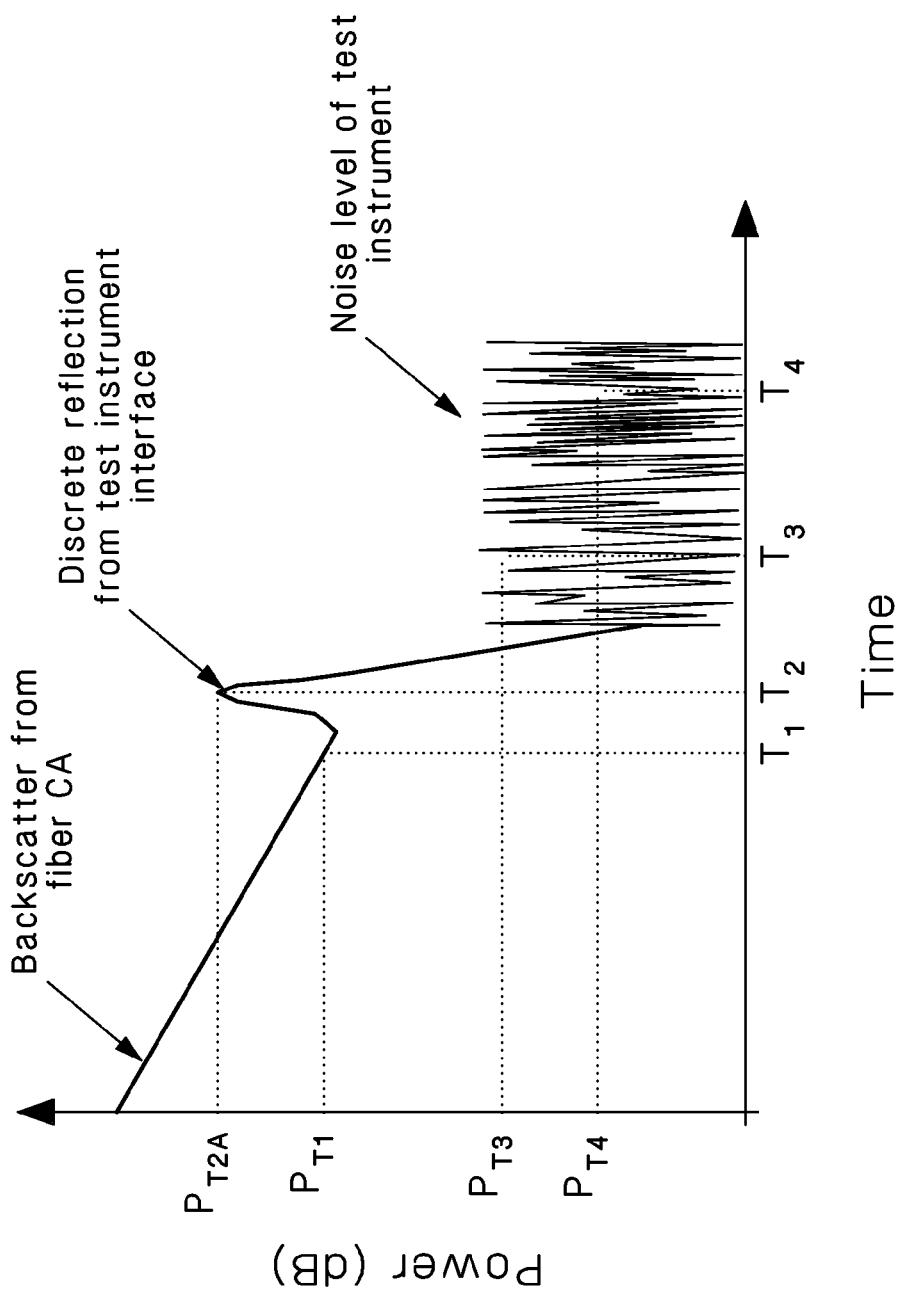
FIG. 4 illustrates a measured signal representative of an uncoupled coupling assembly.
Figure 5:
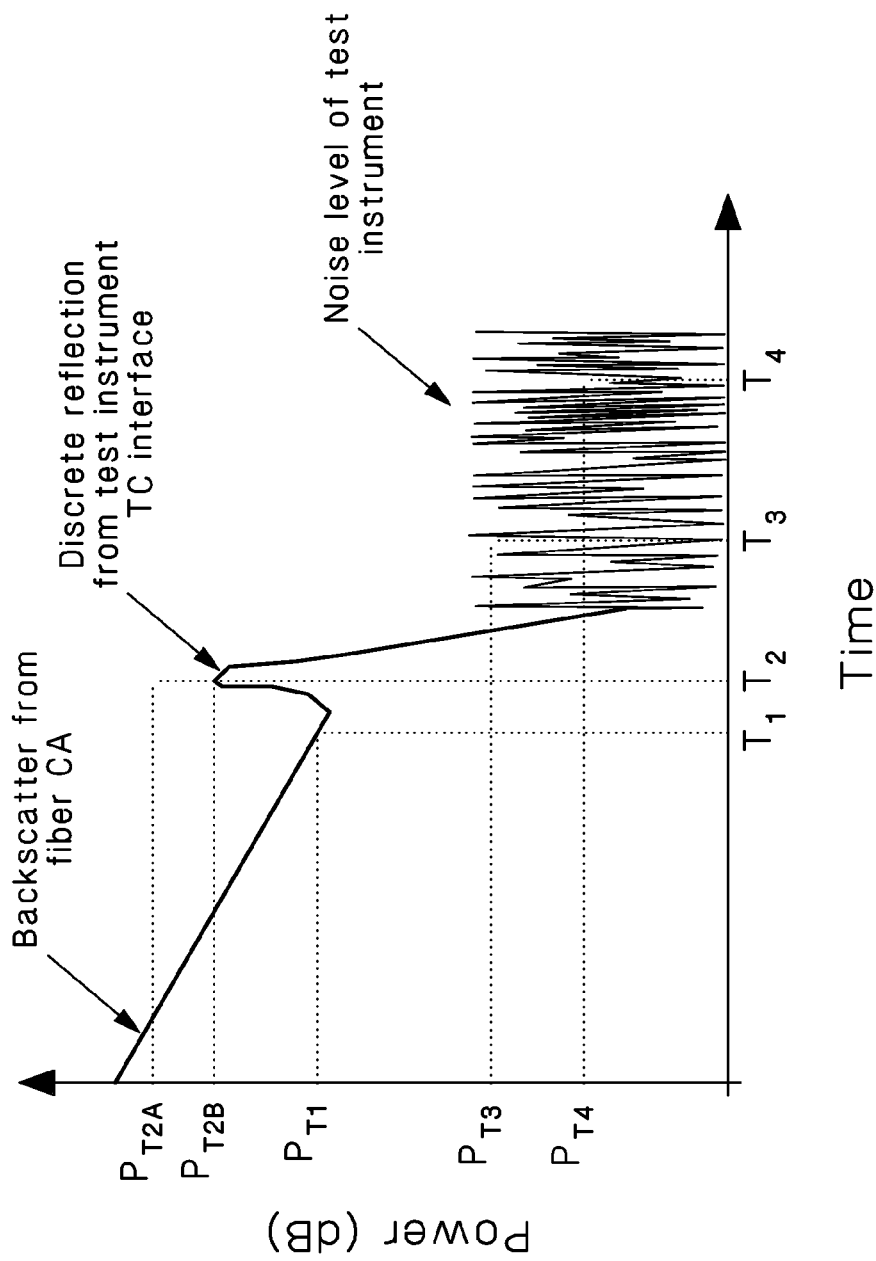
FIG. 5 illustrates a measured signal representative of a coupling assembly coupled to an unterminated test connector.

For example, referring to FIG. 4 and FIG. 5, the electrical signal corresponding to the optical power measured during the time interval $T_2$ is proportional to the return loss of the light pulse traveling from the light source 205 to test connector interface 245. If the test connector 235 is properly coupled to the coupling assembly 215 and the unterminated end of the stub fiber is contained in index-matching gel, as may be the case with some test connectors, the return loss of the stub fiber and index-matching gel interface ($P_{T2B}$) (illustrated in FIG. 4) would be lower than the return loss corresponding to the case where the test connector 235 is not properly connected to the coupling assembly ($P_{T2A}$) (illustrated in FIG. 5). Therefore, having a reference return loss magnitude $P_{T2B}$ corresponding to the return loss of a disconnected coupling assembly and comparing that magnitude to the magnitude of the return loss when the test connector is connected to the coupling assembly, it is possible to evaluate, based on the difference between the two return loss magnitudes (e.g., $P_{T2A}-P_{T2B}$), whether the test connector was properly coupled to the coupling assembly. Once the value of $P_{T2A}-P_{T2B}$ falls within an allowable range (may also be referred to as a threshold), the TTA can signal to the user that a proper connection has been made. In some embodiments, the threshold for an established connection between the test connector and the coupling assembly is pre-programmed into the TTA 200. In other embodiments, the user is capable of adjusting said threshold value. In the event that the test connector 235 is not properly coupled to the coupling assembly 215, the user can reinstall the test connector, as shown in step 320, until a proper coupling is indicated.

Once the test connector 235 has been properly coupled to the coupling assembly 215, the field fiber 240 can be joined to the stub fiber inside the test connector 235 with the assistance of the TTA 200, as shown in steps 325 and 330 of FIG. 3.

Figure 6:
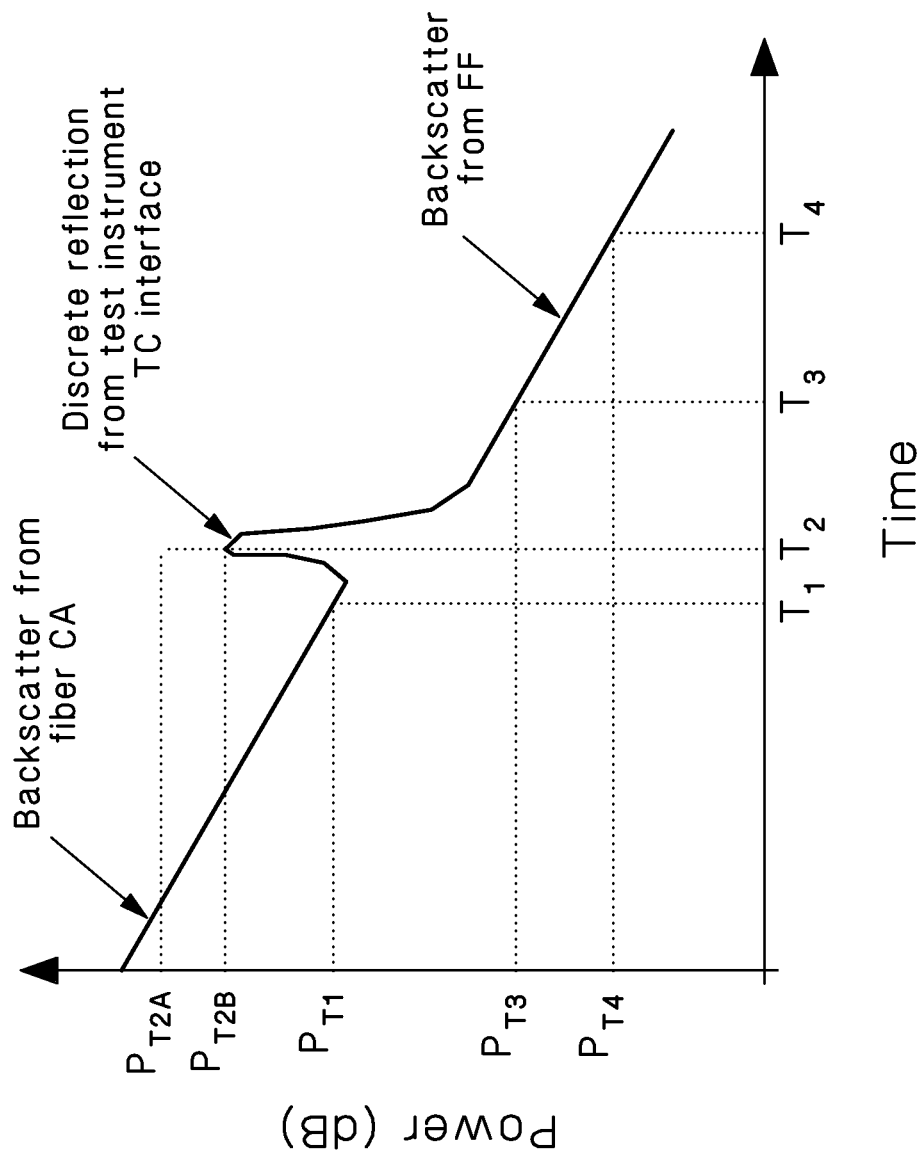
FIG. 6 illustrates a measured signal representative of a coupling assembly coupled a terminated test connector.

Prior to completing the splice, it is important to have proper positioning and alignment between the stub fiber inside the test connector 235 and the field fiber 240. To determine whether this positioning and alignment is within an allowable range, the TTA 200 can measure and compare the magnitudes of optical power measured during time intervals $T_1$, $T_3$, and $T_4$ (as shown in FIG. 6) during various phases of the termination process. For the purposes of the present invention, the time interval $T_3$ is assumed to be adjacent to or near the test connector 235. It is further assumed that the length of the field fiber 240 after the test connector 235 should be sufficient to provide enough reflected/backscattered light in which to perform a measurement of insertion loss and field fiber attenuation per unit of fiber length, either one of which may be measured at time interval $T_4$. In one embodiment, the positioning and alignment of the two fibers is determined to fall within the allowed range if the difference between the measured magnitudes of optical power between time intervals $T_1$ and $T_3$ (i.e. $P_{T1}-P_{T3}$) falls within a predefined range. In one variation of this embodiment, the positioning and alignment of the two fibers is determined to fall within the allowed range if the difference between the measured magnitudes of optical power between time intervals $T_1$ and $T_3$ (i.e. $P_{T1}-P_{T3}$) is equal to or less than approximately 0.75 dB. In another variation of this embodiment, the positioning and alignment of the two fibers is determined to fall within the allowed range if the difference between the measured magnitudes of optical power between time intervals $T_1$ and $T_3$ (i.e. $P_{T1}-P_{T3}$) is equal to or less than approximately 0.50 dB.

If the positioning and alignment of the two fibers fall within the allowed range, the TTA 200 can output a signal to let the user know that such is the case. The signal can be at least one of, but is not limited to, an optical indicator (e.g., a flashing or lit optical beacon such as a colored LED, an indication on a display screen, etc.) and an audio indicator (e.g., an audible tone, a series of beeps, a pre-recorded spoken phrase, etc.). In some embodiments, the output signal can vary with intensity depending on how close or how far to an allowable range the position and alignment of the fibers are. In other embodiments, the signal can be activated and the intensity of the signal can begin to vary once the position and alignment of the fibers has reached an allowable range, where the variance in the signal can correspond to the proximity to or deviation from what would be considered an optimal position and alignment. In yet other embodiments, the output signal can include a variety of information and/or signals related to the positioning and alignment of the fibers. This information and/or signals can be displayed on the display of the TTA, and can include, but is not limited to, values corresponding to the results measured by the analysis circuit, and instructions to the user on how to better position the field fiber relative to the stub fiber to achieve the necessary and/or desired performance. Same or similar notification schemes can be used to indicate a proper connection between the coupling assembly and the test connector, as described in a previous section.

In an embodiment where the field fiber 240 is installed into the optical fiber mechanical splice joint of the test connector 235 by way of a cam mechanism, as presently employed on Panduit's OptiCam® fiber optic connectors, the TTA may measure and compare the magnitude of optical power measured during time interval $T_1$ and $T_3$, (i.e. $P_{T1}-P_{T3}$) before and/or after actuating the cam mechanism of the test connector 235 to determine if the sub fiber and the field fiber 240 were properly terminated. If the user determines that upon final termination the splice produces too great of a difference between the $P_{T1}$ and $P_{T3}$, putting the positioning and alignment out of the allowed range, the user can disengage the cam mechanism, reposition and realign the fiber(s), and reterminate the field fiber again in an attempt to produce a splice joint that is within certain specification. This is illustrated in steps 335, 325, and 330 of FIG. 3.

When the coupling assembly 215 employs a series of optical fibers having the same or similar parameters as the field fiber 240, the decrease in measured optical backscatter power from time interval $T_1$ to time interval $T_3$ is due primarily to the insertion loss of the test connector. However, when at least one of the coupling assembly fibers, the stub fiber, and the field fiber have non-matching backscatter characteristics, the decrease in measured optical backscatter power from time interval $T_1$ to time interval $T_3$ is not only a function of the insertion loss of the test connector, but also of certain parameters which, if not taken into account, would cause the insertion loss of the test connector to be reported in error. This error may be reduced and/or compensated for by adding a correction factor (CF), which may be a function of the backscatter characteristics of the fibers as well as the magnitude of the measured insertion loss. The total insertion loss $IL_{TC}$ of the test connector may be written as:

$$IL_{TC} = P_{T1} - P_{T3} + CF$$

In other embodiments, the TTA of the present invention can utilize a measurement of the power at $T_4$ to provide information on the attenuation (per unit length) of the field fiber. This can be accomplished by subtracting the signal corresponding to the time interval $T_4$ from the signal corresponding to the time interval $T_3$ ($T_3-T_4$). The results are proportional to the field fiber attenuation over the length of the cable between the two test times $T_3$ and $T_4$.

In still other embodiments, the TTA can evaluate the measured values of the test connector insertion loss, the test connector return loss, and/or the field fiber cable attenuation to determine whether the assembled connector performs within certain pre-programmed specification. For example, if the TTA measures the connector to have a loss of 1 dB and compares this measurement with a TIA (Telecommunications Industry Association) standard loss for a connector of 0.75 dB, the TTA may indicate that this connector fails the TIA standards. If, on the other hand, the connector loss is measured at 0.5 dB, the TTA can indicate that the connector passes or is within the TIA standard. The indication of passing/failing of any particular specification can be accomplished by any suitable means including, but not limited to, any means described above in connection with outputting the output signal. The pre-programmed specifications may be loaded into the TTA at the time of manufacture and/or any time after the manufacture by way of a suitable data link.

If, after terminating the field fiber, the TTA outputs a favorable result, the user can remove the test connector from the TTA as shown in step 340, completing the termination process.

Note that while this invention has been described in terms of one or more embodiment(s), these embodiment(s) are non-limiting, and there are alterations, permutations, and equivalents, which fall within the scope of this invention. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. An apparatus for evaluating integrity of a splice joint present within an optical fiber, said apparatus comprising:
   a fiber optic coupling assembly configured to be directly or indirectly connectable to said optical fiber;
   a light source in optical communication with said fiber optic coupling assembly, said light source configured to generate light pulses, wherein said light pulses are coupled to said optical fiber, and wherein at least a portion of said coupled light pulses are at least one of backscattered and reflected within said optical fiber; and
   a photo detector in optical communication with said fiber optic coupling assembly, said photo detector configured to detect said at least one of backscatter and reflection,
   wherein said optical fiber is positioned at least partially within a fiber optic connector, said fiber optic connector being a re-terminable fiber optic connector having a stub fiber therein and configured to be connectorized to a field fiber, said optical fiber including said stub fiber and said field fiber, and
   wherein said fiber optic coupling assembly is directly or indirectly connectable to said fiber optic connector.

2. The apparatus of claim 1, wherein said light source and said photo detector are in optical communication with said fiber optic coupling assembly via a circulator.

3. The apparatus of claim 1 further comprising an analysis circuit, said analysis circuit in communication with said photo detector and configured to output an output signal, said output signal being a function of said detection of said at least one of backscatter and reflection.

4. The apparatus of claim 3 further comprising a pass/fail indicator, said pass/fail indicator being responsive to said output signal.

5. The apparatus of claim 3, wherein said output signal corresponds to at least one of a satisfactory connection to said optical fiber, an unsatisfactory connection to said optical fiber, a satisfactory splice joint, and an unsatisfactory splice joint.

6. The apparatus of claim 3,
   wherein each of said stub fiber, said field fiber, and said fiber optic coupling assembly has a respective backscatter characteristic and a respective reflection characteristic, and
   wherein said analysis circuit compensates for at least one of non-matching backscatter characteristic and non-matching reflection characteristic between at least two of said fiber optic coupling assembly, said stub fiber, and said field fiber.

7. The apparatus of claim 1, wherein said fiber optic coupling assembly is indirectly connectable to said optical fiber via a fiber optic adapter.

8. The apparatus of claim 1, wherein said light source is at least one of a laser and a light emitting diode.

9. The apparatus of claim 1, wherein said light source is a laser emitting a light signal having a wavelength between about 700 nm and about 1700 nm.

10. The apparatus of claim 1, wherein said photo detector is at least one of a PIN photo detector, an avalanche photo detector, and a single photon avalanche diode.

11. The apparatus of claim 1, wherein said light source generates light pulses having a duration between about 0.1 ns and about 1 µs.

12. The apparatus of claim 1, wherein said light source generates light pulses having an amplitude of about 0.1 mW to about 100 mW.

13. The apparatus of claim 1 further including a hand-held enclosure, said hand-held enclosure having a power supply, a display, and at least one of a touch-screen keyboard and a non-touch-screen keyboard,
   wherein said fiber optic coupling assembly, said light source, and said photo detector are housed within said hand-held enclosure.

\* \* \* \* \*